(12) United States Patent
Muto (10) Patent No.: US 7,475,913 B2
(45) Date of Patent: Jan. 13, 2009

(54) TUBE JOINT

(75) Inventor: Masaaki Muto, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 152 days.

(21) Appl. No.: 11/155,497

(22) Filed: Jun. 20, 2005

(65) Prior Publication Data

US 2005/0285394 A1 Dec. 29, 2005

(30) Foreign Application Priority Data

Jun. 29, 2004 (JP) ............... 2004-190673

(51) Int. Cl.
*F16L 35/00* (2006.01)
*F16L 17/00* (2006.01)
(52) U.S. Cl. .............. 285/39; 285/104; 285/307; 285/308; 285/323
(58) Field of Classification Search ............ 285/104, 285/277, 295.2, 137.11, 121.6, 86, 308, 322, 285/319, 206, 307, 39, 316, 324, 323, 354
See application file for complete search history.

(56) References Cited

U.S. PATENT DOCUMENTS

| | | | | |
|---|---|---|---|---|
| 4,431,216 A | * | 2/1984 | Legris | 285/104 |
| 4,538,842 A | * | 9/1985 | Kowal et al. | 285/354 |
| 5,174,611 A | * | 12/1992 | Byrd et al. | 285/45 |
| 5,605,358 A | * | 2/1997 | Mohlenkamp | 285/39 |
| 5,762,380 A | | 6/1998 | Hiwatashi et al. | |
| 6,099,046 A | * | 8/2000 | Oh | 285/354 |
| 6,578,879 B2 | | 6/2003 | Muto | |
| 2001/0045748 A1 | | 11/2001 | Muto | |
| 2003/0122372 A1 | | 7/2003 | Muto | |
| 2005/0110275 A1 | * | 5/2005 | Hama | 285/322 |

FOREIGN PATENT DOCUMENTS

| | | | | |
|---|---|---|---|---|
| DE | 697 00 365 | | 12/1999 | |
| DE | 699 05 514 | | 12/2003 | |
| GB | 2165604 | * | 11/1984 | 285/319 |
| JP | 11-325362 | | 11/1999 | |
| JP | 2003-254483 | | 9/2003 | |

* cited by examiner

*Primary Examiner*—James M Hewitt
*Assistant Examiner*—Jay R Ripley
(74) *Attorney, Agent, or Firm*—Paul A. Guss (57) ABSTRACT

An installation groove is formed on an outer circumferential surface of a tube joint body, into which a fluid tube is inserted. An annular fixing ring is installed through interaction with the installation groove. A cylindrical guide member is arranged inside of the body. A chuck is provided that engages with an outer circumferential surface of the fluid tube, thereby retaining the fluid tube. When a fastening pawl of the chuck bites into the outer circumferential surface of the fluid tube, the guide member is pressed radially outwardly by the chuck, with the tube joint body being interposed between the guide member and the fixing ring.

16 Claims, 11 Drawing Sheets

TUBE JOINT

BACKGROUND OF THE INVENTION

1. Field of the Invention

The present invention relates to a tube joint to which a fluid tube for introducing or discharging a fluid is connectable.

2. Description of the Related Art

A tube joint has been hitherto used in order to connect a fluid tube to a fluid pressure-operated apparatus such as a cylinder. Such a tube joint is provided with a body into which the tube joint is inserted. A fastening tab, which protrudes radially inwardly by a predetermined length, is provided for the body. The fluid tube is slightly pulled in a direction opposite to the direction of insertion after the fluid tube has been inserted. Accordingly, the forward end of the fastening tab is allowed to bite into the outer circumferential surface of the fluid tube to prevent the fluid tube from becoming disengaged from the body. The fastening tab is retained by an engaging member, which is installed on the body.

In the tube joint as described above, for example, the body sometimes is formed of a resin material in order to reduce its weight. In such a situation, when the fastening tab is allowed to bite into the fluid tube inserted into the tube joint, the body is pressed and becomes deformed in some cases, because the fastening tab is displaced radially outwardly. For this reason, a pair of ring members, each of which is composed of a metal material, may be installed on the outer circumferential surface of the body, so that the body, which is composed of the resin material, is prevented from becoming deformed radially outwardly (see, for example, Japanese Laid-Open Patent Publication No. 11-325362).

SUMMARY OF THE INVENTION

The present invention has been made in relation to the invention disclosed in Japanese Laid-Open Patent Publication No. 11-325362 described above, wherein a general object of the present invention is to provide a tube joint which has a simple structure and which is capable of reliably suppressing deformation of the body.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
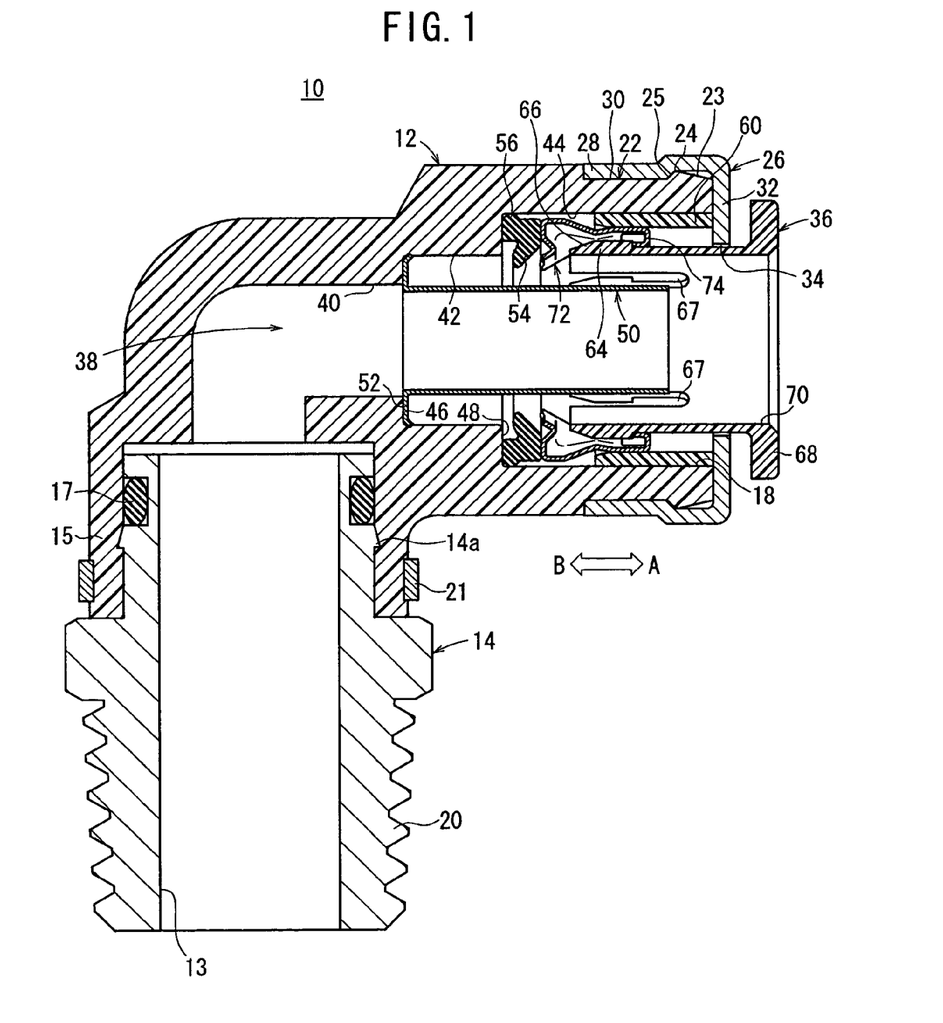
FIG. 1 shows a longitudinal sectional view illustrating a tube joint according to a first embodiment of the present invention.

With reference to FIG. 1, reference numeral 10 indicates a tube joint according to a first embodiment of the present invention.

Figure 5:
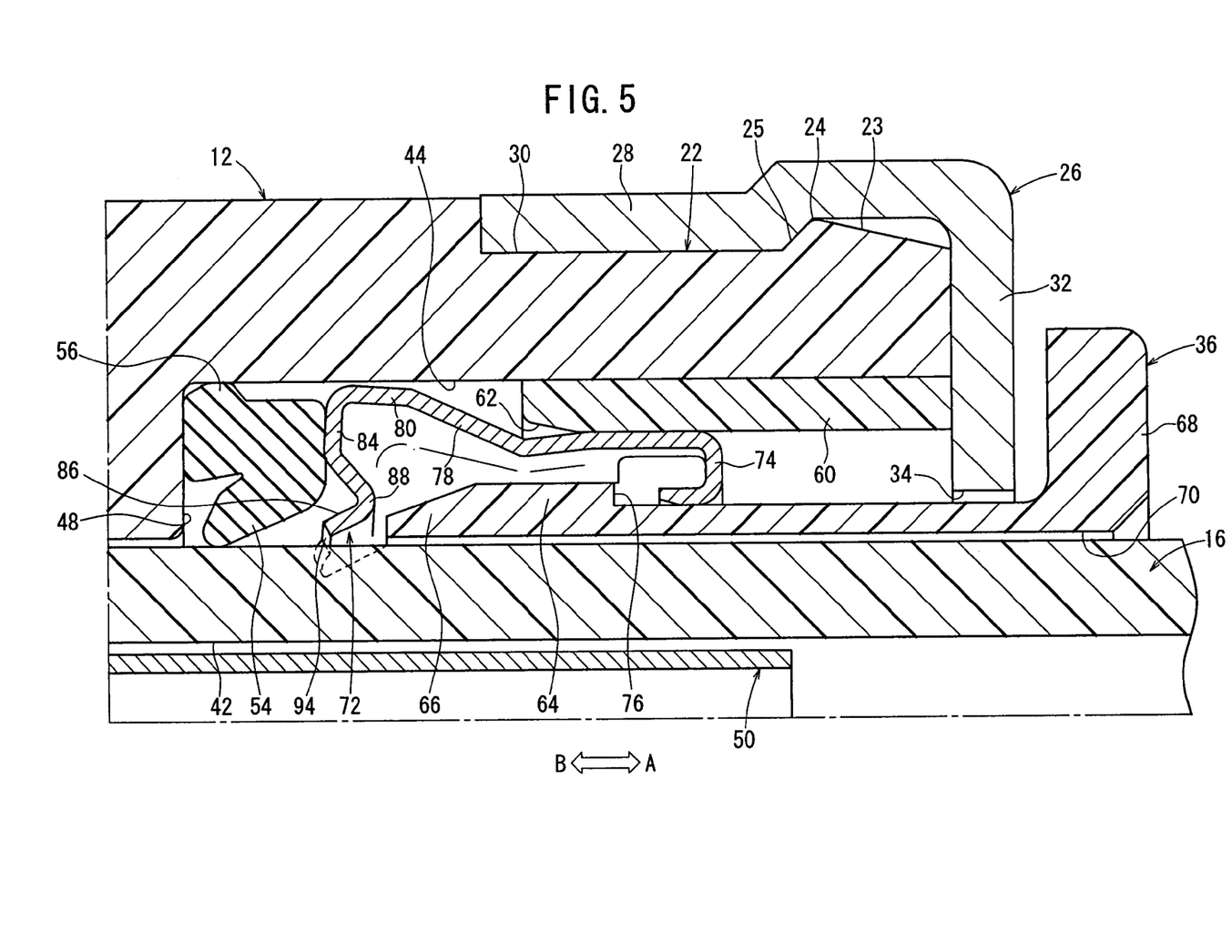
FIG. 5 shows a magnified longitudinal sectional view illustrating features disposed in the vicinity of a chuck shown in FIG. 3.

As shown in FIGS. 1 to 8, the tube joint 10 has a cylindrical body 12, which is made of a resin material, and which is bent in a substantially L-shaped form. A connecting section 15, to which a cylindrical connecting member 14 formed with a passage 13 for allowing a fluid to flow therethrough is installed, is formed on one end side of the body 12. An opening 18, into which a fluid tube 16 composed of a resin material (see FIG. 3) is inserted, is formed on the other end side of the body 12. The body 12 is not specifically limited to comprising a structure formed of a resin material. As shown in FIG. 5, the body 12 may also be formed of a metal material.

An engaging projection 14*a*, which protrudes to provide a sharp cross section, is formed on the outer circumferential surface of the connecting member 14, on one end side to be inserted into the body 12. The engaging projection 14*a* engages with the inner circumferential surface of the connecting section 15 of the body 12. Accordingly, the connecting member 14 is integrally installed to the body 12, in a state that prevents the connecting member 14 from disengagement from the body 12. A band member 21, which tightens the connecting portion between the connecting section 15 and the connecting member 14, is installed to the outer circumferential surface of the connecting section 15. The band member 21 may be formed of a metal material. The band member 21 is installed on the body 12 by being caulked at an outer circumferential portion thereof. The band member 21 integrally connects the connecting section 15 and the connecting member 14.

An O-ring 17 is installed in an annular groove on the outer circumferential surface of the connecting member 14. The O-ring 17 abuts against the inner circumferential surface of the connecting section 15, and thus a pressure fluid, which flows through a fluid passage 38 of the body 12, is prevented from leaking to the outside.

On the other hand, a screw section 20 is formed on the outer circumferential surface, on the other end side of the connecting member 14. The screw section 20 is connected to an unillustrated fluid pressure-operated apparatus such as a cylinder. That is, the tube joint 10 is integrally connected to the fluid pressure-operated apparatus by the aid of the connecting section 14.

An installation groove 22, which is recessed by a predetermined depth radially inwardly, is formed on the outer circumferential surface on the other end side of the body 12. As shown in FIG. 5, the installation groove 22 is formed with a first tapered surface 23, which is gradually expanded in diameter from the other end side of the body 12 (in the direction of arrow A), an apex section (projection) 24 having a substantially triangular cross section and at which the first tapered surface 23 is maximally expanded in diameter radially outwardly, a second tapered surface (inclined surface) 25, which is gradually reduced in diameter from the apex section 24 toward the connecting section 15 (in the direction of arrow B), and a circumferential surface section 30 provided adjacent to the second tapered surface 25 and which is formed substantially in parallel to the axis of the body 12. The apex section 24 is formed annularly along the circumferential surface of the installation groove 22.

An annular fixing ring (ring member) 26 is installed in the installation groove 22 from the other end side of the body 12 (in the direction of arrow A). A circumferential wall section (first wall section) 28 of the fixing ring 26 abuts against the circumferential surface section 30 of the installation groove 22. The fixing ring 26 is caulked integrally with the body 12 radially inwardly, by means of an unillustrated caulking jig, after the fixing ring 26 has been installed in the installation groove 22. Accordingly, the inner circumferential portion of the circumferential wall section 28 is deformed along the circumferential surface section 30 and the second tapered surface 25 of the installation groove 22, to thereby engage with the apex section 24 by the aid of the second tapered surface 25. As a result, displacement of the fixing ring 26 in the axial direction (in the directions of arrows A, B) is regulated. The fixing ring 26 thus is prevented from disengagement from the body 12.

An orthogonal wall section (second wall section) 32, which is substantially perpendicular to the circumferential wall section 28 installed to the installation groove 22, and which extends radially inwardly, is formed for the fixing ring 26. An insertion hole 34 is formed at a substantially central portion of the orthogonal wall section 32, into which a release bush 36 is inserted as described later on. Further, the orthogonal wall section 32 abuts against the other end of the body 12 and a guide member 60.

As shown in FIGS. 1 to 8, the fluid passage 38, which penetrates from one end side to the other end side of the body 12, is formed in the body 12. The fluid passage 38 includes a first hole 40, which is formed on the side of the connecting section 15 of the body 12 (in the direction of arrow A), a second hole 42 formed adjacently to the first hole 40, and a third hole 44, which adjoins the second hole 42 and which is formed on the side of the opening 18 of the body 12 (in the direction of arrow B).

The third hole 44 is formed and expanded in diameter radially outwardly, as compared with the second hole 42. The second hole 42 is formed and expanded radially outwardly, as compared with the first hole 40. That is, the fluid passage 38 is formed so that its diameter increases in a stepwise manner in order of the first hole 40, the second hole 42, and the third hole 44.

A first boundary surface 46, which is substantially perpendicular to the axial direction of the body 12, is formed at the boundary portion between the first hole 40 and the second hole 42. Similarly, a second boundary surface 48, which is substantially perpendicular to the axial direction of the body 12, is also formed at the boundary portion between the second hole 42 and the third hole 44.

Figure 2:
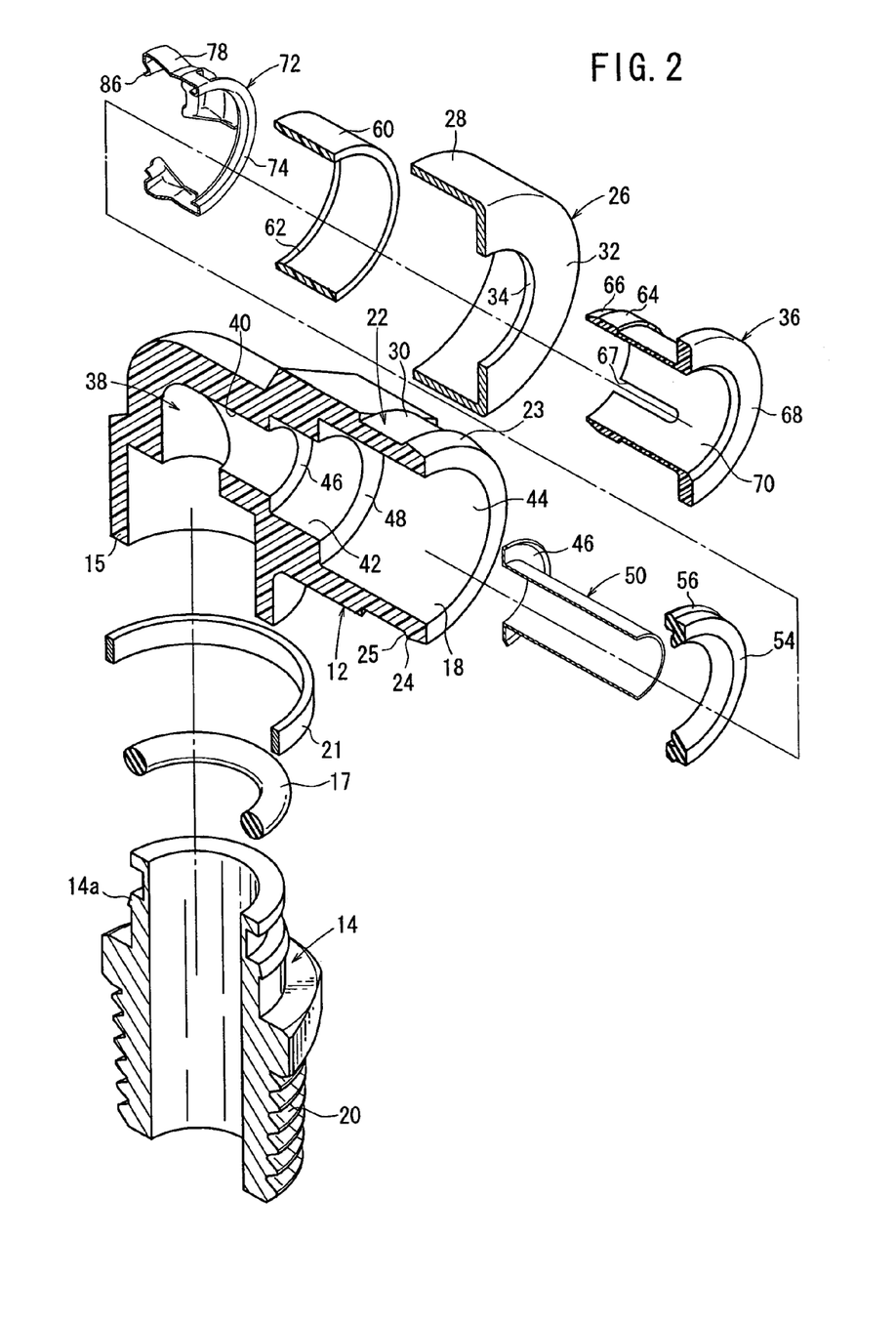
FIG. 2 shows, with partial cross section, an exploded perspective view illustrating the tube joint shown in FIG. 1.

A substantially cylindrical sleeve 50 is inserted through the opening 18 of the body 12 into the second and third holes 42, 44. A flange section 52 of the sleeve 50 abuts against the first boundary surface 46. Therefore, the sleeve 50 does not disengage from the side of the connecting section 15 of the body 12 through the first hole 40 (in the direction of arrow A). As shown in FIG. 2, the fluid tube 16 is inserted on the outer circumferential side of the sleeve 50. Further, the sleeve 50 functions to guide the fluid tube 16 in the axial direction (in the direction of arrow A) when the fluid tube 16 disengages from the body 12.

A packing 54, which is composed of an elastic material (for example, rubber), is installed in the third hole 44 so that the packing 54 abuts against the second boundary surface 48. The packing 54 is formed to be annular, and protrudes so that its inner circumferential portion is inclined by a predetermined angle toward the connecting section 15 of the body 12 (in the direction of arrow A). A bulge 56, which protrudes radially outwardly, is formed on the outer circumferential side of the packing 54. When the fluid tube 16 is inserted into the body 12, the bulge 56 is pressed radially outwardly by the fluid tube 16, and in addition, the bulge 56 is crushed by the inner circumferential surface of the third hole 44. Accordingly, air tightness is retained between the inside of the third hole 44 and the outer circumferential surface of the fluid tube 16.

The cylindrical guide member 60 is inserted into the third hole 44 from the opening 18. The guide member 60 is inserted until it arrives at a position at which the end surface of the guide member 60 is substantially flush with the other end surface of the body 12 (see FIG. 3). That is, displacement of the guide member 60 is regulated in the axial direction (in the direction of arrow A) in the third hole 44 by the orthogonal wall section 32 of the fixing ring 26. Further, as a result, disengagement of the guide member 60 from the inside of the body 12 is prevented.

The guide member 60 is formed of a cylindrical resin material. Therefore, the guide member 60 is formed to be deformable slightly in the radial direction. The guide member 60 of the present invention is not limited to being formed of a resin material. Alternatively, the guide member 60 may be formed of a metal material.

On the other hand, the end surface of the guide member 60, which is disposed on the side of the packing 54 (in the direction of arrow B), is provided at substantially the same position, in the axial direction, as that of the end surface of the circumferential wall section 28 of the fixing ring 26.

Figure 7:
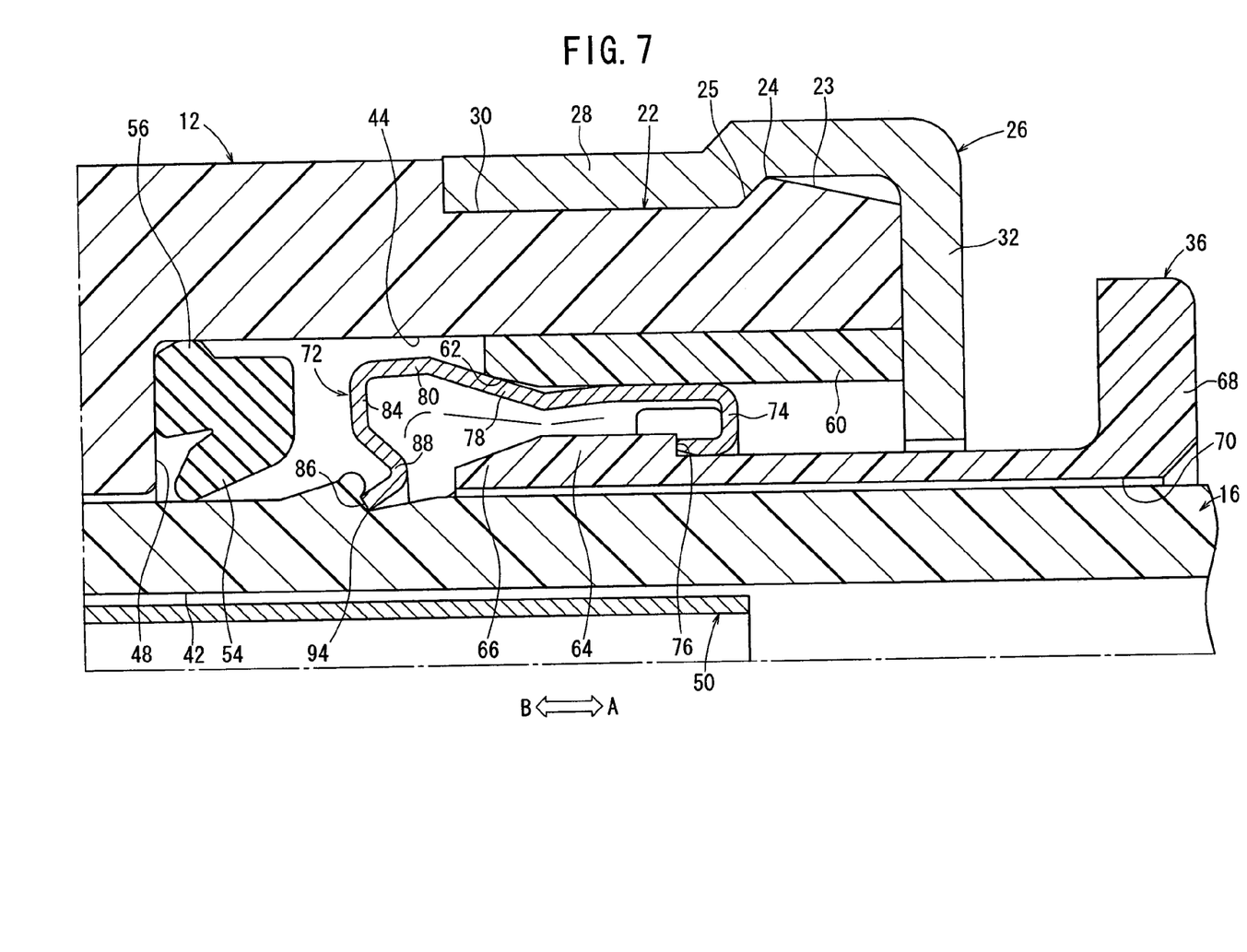
FIG. 7 shows a magnified longitudinal sectional view illustrating features disposed in the vicinity of the chuck shown in FIG. 6.

As shown in FIGS. 5 and 7, an inclined surface 62, which is gradually expanded in diameter toward the other end side of the guide member 60, is formed on the inner circumferential surface opposed to the sleeve 50, at one end of the guide member 60 on the side of the packing 54.

A part of the substantially cylindrical release bush 36 is inserted through the opening 18 of the body 12 into the guide member 60. The release bush 36 is inserted displaceably in the axial direction (in the directions of arrows A, B) with respect to the guide member 60. An expanded section 64, which is expanded by a predetermined amount radially outwardly, is formed at one end of the release bush 36. A diametrally reduced section 66 also is formed, which is gradually reduced in diameter from the expanded section 64 toward the forward end of the release bush 36.

A plurality of slits 67 (see FIG. 1), which are separated from each other by predetermined angles in the circumferential direction, are formed at one end of the release bush 36.

On the other hand, as shown in FIGS. 1 to 8, a flange section 68, which is expanded in diameter radially outwardly, is formed at the other end of the release bush 36. The flange section 68 is formed to have an outer circumferential diameter that is larger than the inner circumferential diameter of the third hole 44.

A through-hole 70, which penetrates in the axial direction and through which the fluid tube 16 is inserted, is formed in the release bush 36. The inner circumferential diameter of the through-hole 70 is formed to be slightly larger than the outer circumferential diameter of the fluid tube 16.

As shown in FIGS. 5 and 7, a chuck 72 is formed by press-working a thin plate member. The chuck 72 is arranged so that a portion thereof is disposed between the inner circumferential surface of the guide member 60 and the outer circumferential surface of the release bush 36.

An engaging section 74, which is bent radially inward in a substantially U-shaped cross section, is formed annularly on one end side of the chuck 72. The inner circumferential surface of the engaging section 74 is slidable along the outer circumferential surface of the release bush 36. A stepped section 76 is formed at a boundary portion between the expanded section 64 and the outer circumferential surface of the release bush 36. An end of the engaging section 74 is engaged with the stepped section 76, under a displacement action of the chuck 72 in the axial direction. Accordingly, the release bush 36 is prevented from being disengaged from the body 12.

The chuck 72 extends from the engaging section 74 toward the connecting section 15 (in the direction of arrow B), while being inscribed by the inner circumferential surface of the guide member 60. The chuck 72 includes an inclined section 78, which is gradually expanded in diameter radially outwardly in the third hole 44, and a diametrally expanded section 80, which is formed substantially parallel to the inner circumferential surface of the third hole 44. A clearance, having a predetermined spacing distance, is provided between an outer circumferential surface of the diametrally expanded section 80 and an inner circumferential surface of the third hole 44 of the body 12.

On the other hand, the other end of the chuck 72 is arranged between the packing 54 and the diametrally reduced section 66 of the release bush 36. A plurality of slits (not shown) are formed, and are separated from each other by predetermined angles in the circumferential direction. Features formed at the other end of the chuck 72 include a flat surface section 84, which is bent substantially perpendicularly to the diametrally expanded section 80 toward the inner circumferential side, a fastening pawl 86, which protrudes while being inclined by a predetermined angle toward the connecting section 15 (in the direction of arrow B) at the end on the inner circumferential side of the flat surface section 84, and a curved section 88, which is recessed by a predetermined length toward the opening 18 (in the direction of arrow A) and which connects the fastening pawl 86 and the flat surface section 84.

As shown in FIG. 2, the fastening pawl 86 of the chuck 72 is formed so that the fastening pawl 86 is elastically expandable in diameter and reducible in diameter with respect to the annularly formed engaging section 74.

The fastening pawl 86 protrudes slightly radially inwardly from the inner circumferential surface of the release bush 36. A blade edge 94, which is substantially orthogonal, is formed at the end of the fastening pawl 86 opposed to the fluid tube 16. When the fluid tube 16 is pulled, the blade edge 94 bites into the outer circumferential surface of the fluid tube 16.

Figure 9:
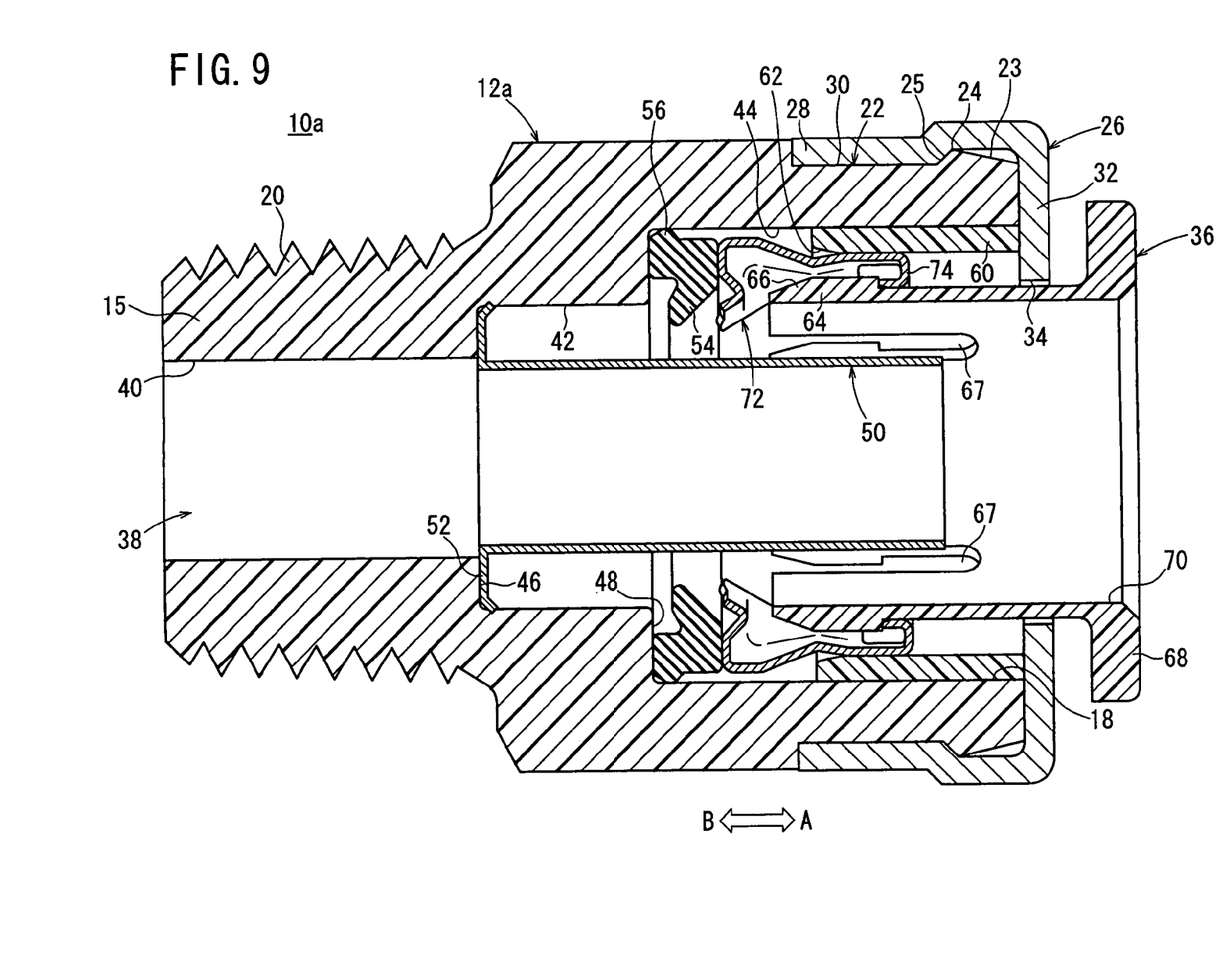
FIG. 9 shows a longitudinal sectional view illustrating a modified embodiment in which a body of a tube joint as shown in FIG. 1 is formed in a straight shape.

The foregoing explanations apply to a tube joint 10 having the body 12, which is bent in a substantially L-shaped form. However, the invention is not limited to an L-shaped form. As shown in FIG. 9, a tube joint 10a, in which a body 12a is formed in a substantially straight form, may also be adopted, depending on the environment and manner in which the tube joint is used.

The tube joint 10 according to the first embodiment of the present invention is basically constructed as described above. Next, its operation, function, and effects shall be explained.

The fluid tube 16, to which the unillustrated fluid pressure-operated apparatus or the like is connected, is inserted from the opening 18 along the sleeve 50, and into the tube joint 10, as shown in FIG. 1. The end surface of the fluid tube 16 abuts against the flange section 52 of the sleeve 50 (see FIG. 3).

Figure 3:
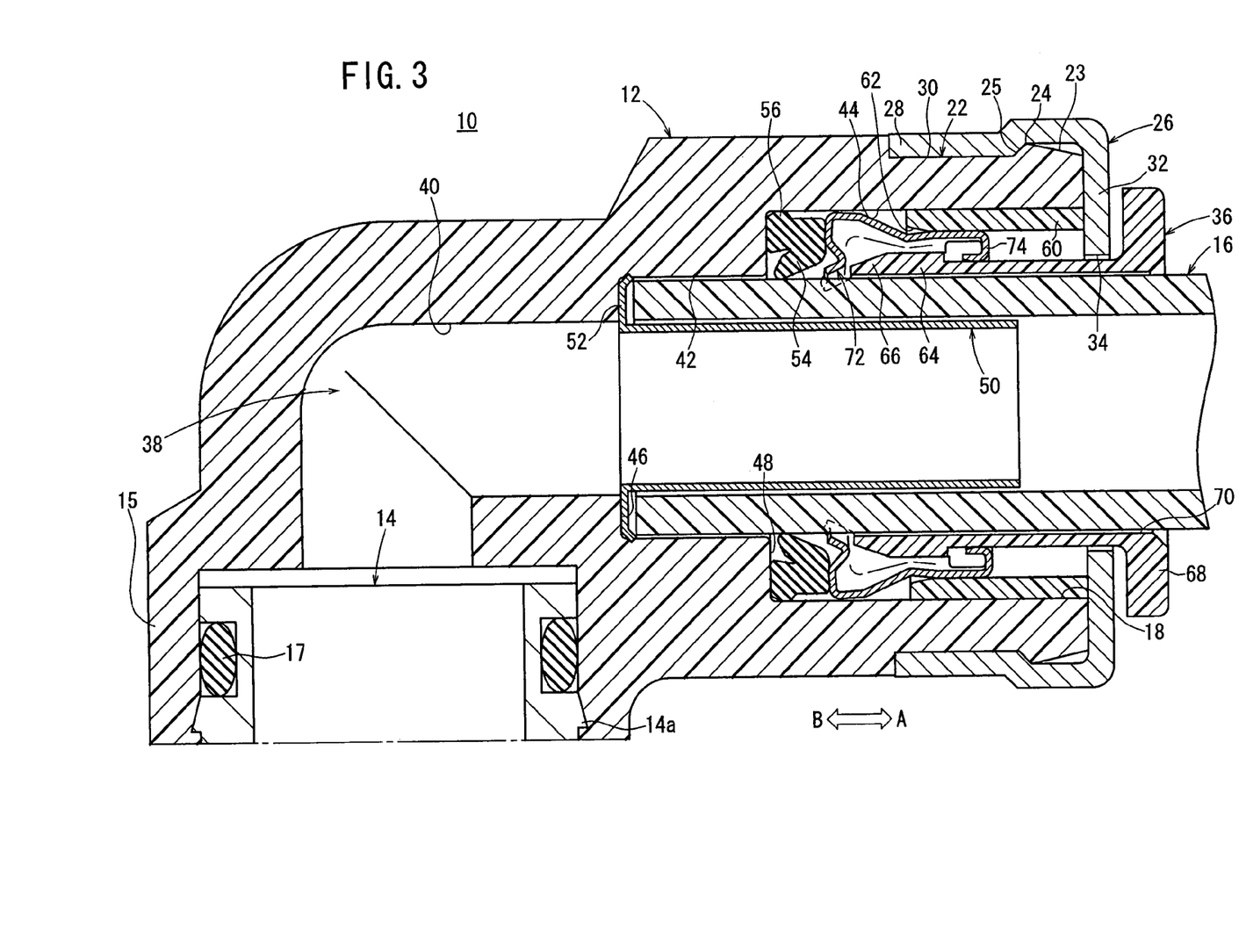
FIG. 3 shows a longitudinal sectional view illustrating a state in which a fluid tube is inserted into the tube joint shown in FIG. 1.
Figure 4:
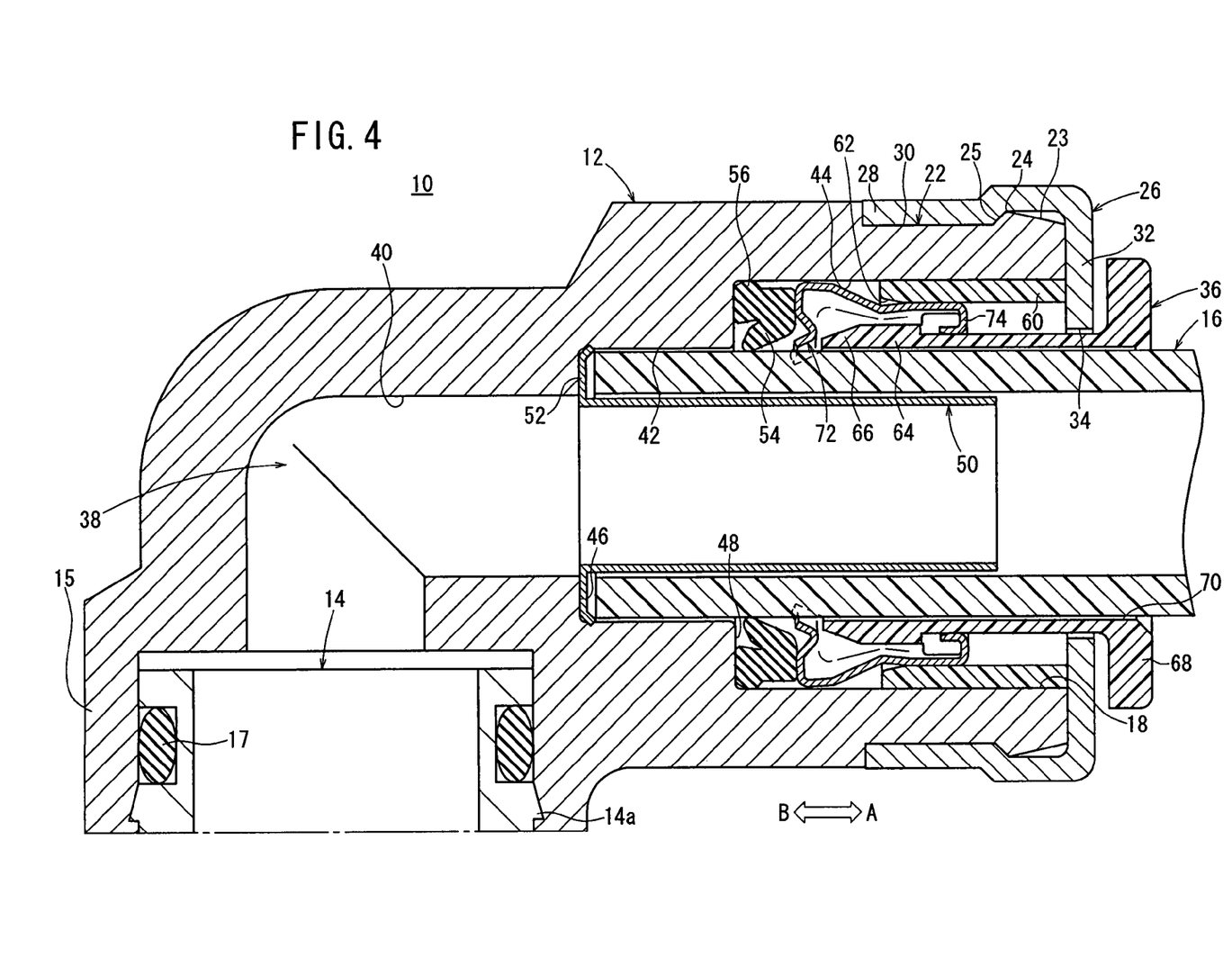
FIG. 4 shows a longitudinal sectional view illustrating a situation in which a body of the tube joint shown in FIG. 3 is formed of a metal material.

In this condition, as shown in FIG. 3, the inner circumferential surface of the packing 54 abuts against the outer circumferential surface of the fluid tube 16. Accordingly, air tightness is retained with respect to the pressure fluid flowing through the body 12. Fluid, which flows through the inside of the fluid passage 38, is prevented from leaking to the outside.

Similarly, the other end of the chuck 72 is forcibly expanded radially outwardly by the fluid tube 16. Accordingly, a state is given in which the diametrally expanded section 80 is displaced toward the inner circumferential surface of the third hole 44, and the fastening pawl 86 abuts against the outer circumferential surface of the fluid tube 16.

Figure 6:
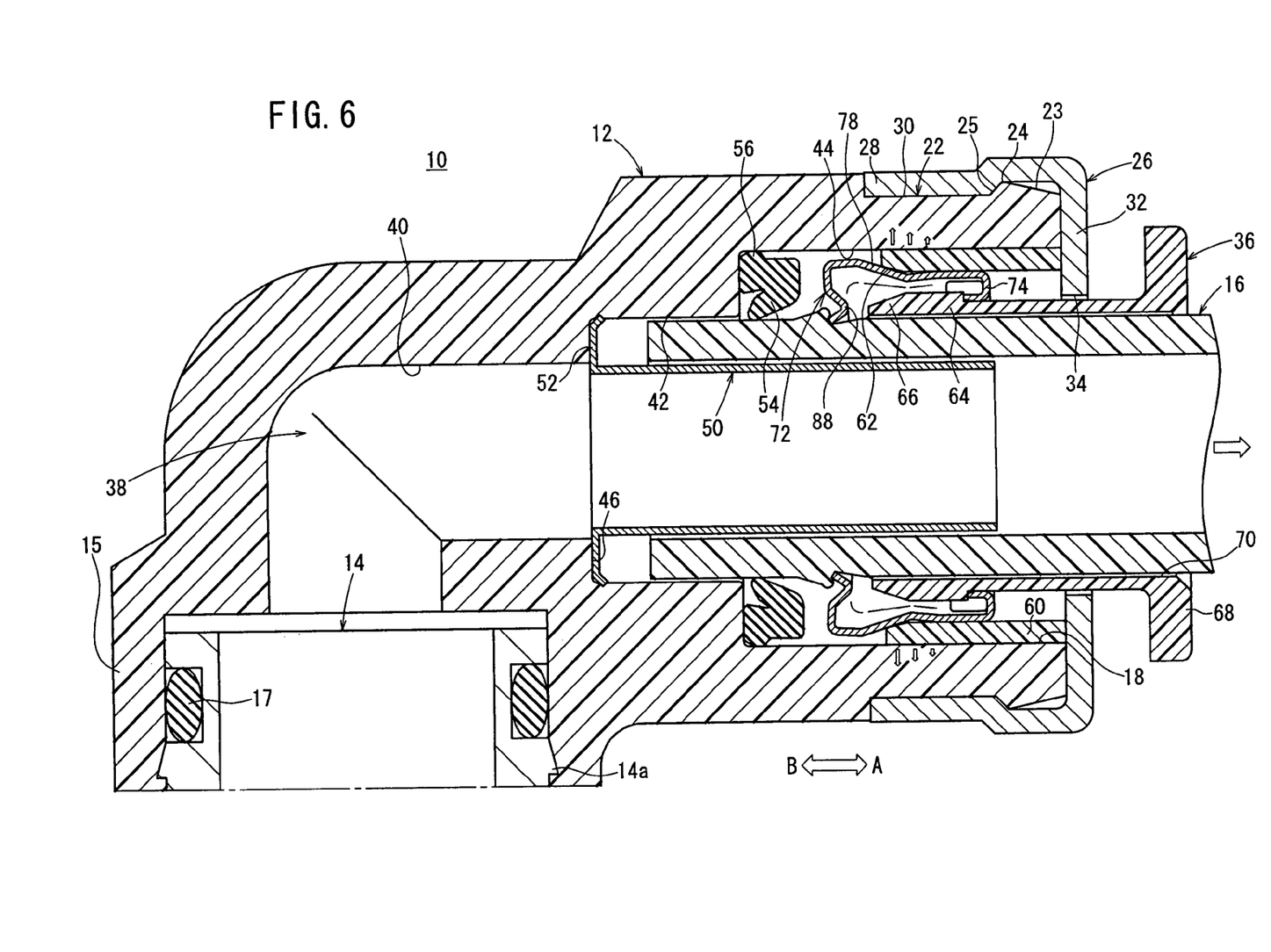
FIG. 6 shows a magnified longitudinal sectional view illustrating a state in which the fluid tube shown in FIG. 3 is pulled in a direction to make separation from the tube joint, and the fastening pawl of the chuck is allowed to bite into the outer circumferential surface of the fluid tube.

After the fluid tube 16 has been inserted into the release bush 36, the fluid tube 16 is pulled slightly toward the flange section 68 of the release bush 36 (in the direction of arrow A), as shown in FIG. 6. Accordingly, the fastening pawl 86 bites into the outer circumferential surface under the pulling action of the fluid tube 16. A lump of material on the outer circumferential surface of the fluid tube 16 enters the inside of the curved section 88, along an upper surface of the fastening pawl 86. As a result, a state is given in which the fluid tube 16 is reliably fastened to the body 12 of the tube joint 10 by the fastening pawl 86, which bites into the outer circumferential surface, and the lump of material that enters the curved section 88.

When it is intended to pull the fluid tube 16 toward the flange section 68 of the release bush 36 (in the direction of arrow A), the lump of material, which has entered the curved section 88, serves as a resistance against displacement, when the fluid tube 16 is displaced. Therefore, the fluid tube 16 is reliably fastened, and the fluid tube 16 is prevented from disengagement from the tube joint 10. Further, the fastening pawl 86 is prevented from further biting into the fluid tube 16.

On the other hand, when the fastening pawl 86 bites into the fluid tube 16, the diametrally expanded section 80 and the inclined section 78 of the chuck 72 are displaced radially outwardly, under the pulling action of the fluid tube 16. Accordingly, the inclined section 78 abuts against the inclined surface 62 of the guide member 60, thereby pressing the guide member 60 radially outwardly (see FIG. 6).

In this condition, the fixing ring 26 is provided on the outer circumferential side of the guide member 60 covering the body 12 therewith. Further, the fixing ring 26 is formed from a metal material. Therefore, even when a radially outward pressing force is applied to the body 12 via the guide member 60, the fixing ring 26 prevents the body 12, which is composed of the resin material, from being expanded in diameter radially outwardly. In other words, when the other end side of the body 12 is surrounded by the fixing ring 26, the rigidity of the body 12 is improved on the other end side.

Therefore, when the fluid tube 16 is retained by the chuck 72, the force exerted by the chuck 72 in order to retain the fluid tube 16 is not released radially outwardly, and therefore, the fluid tube 16 is reliably fastened and retained by the chuck 72. Further, the circumferential wall section 28 of the fixing ring 26 covers the entire portion of the guide member 60, ranging to the end surface on the side of the packing 54 (in the direction of arrow B). Therefore, the pressing force, which is applied from the guide member 60 to the body 12, can be reliably received.

Figure 8:
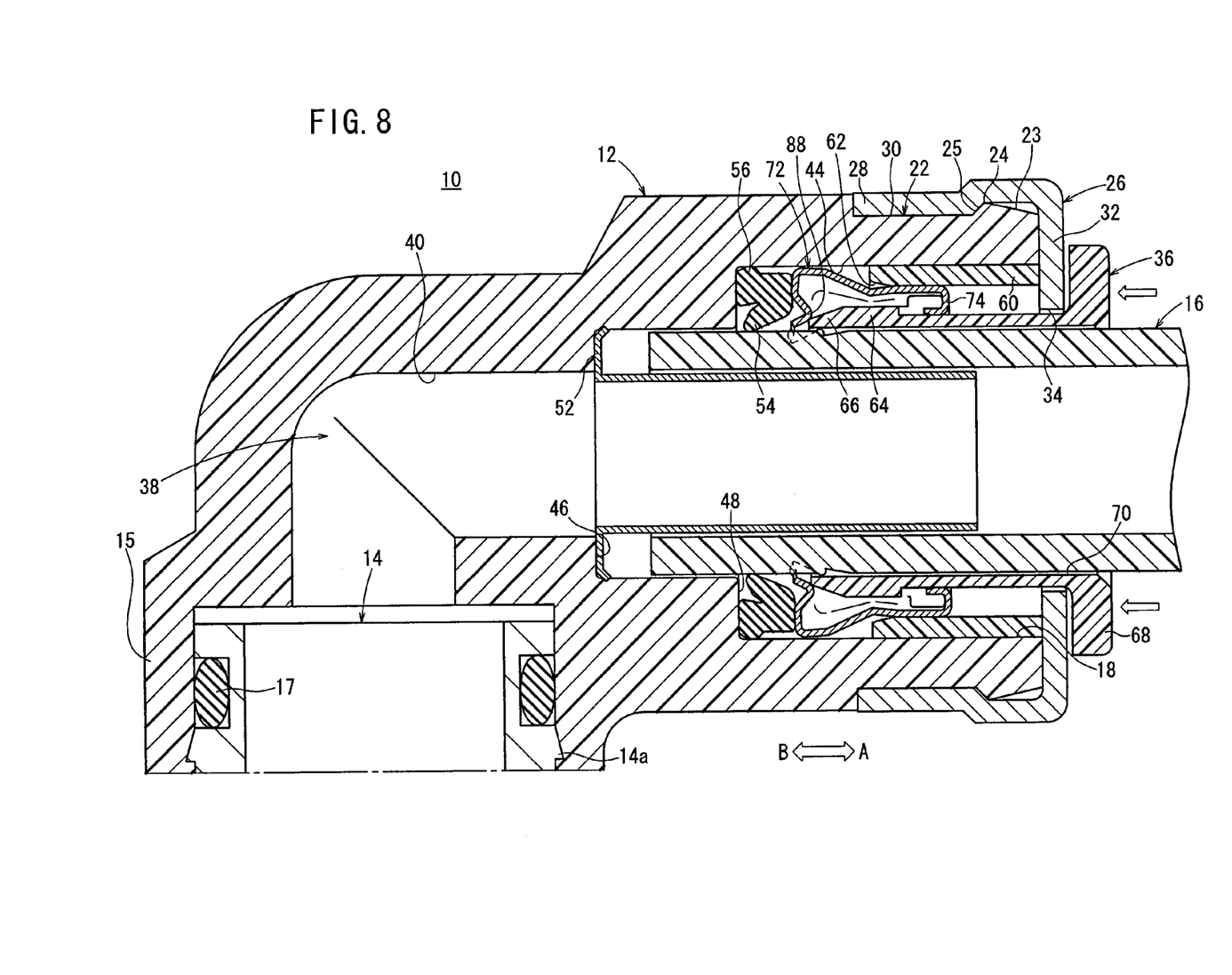
FIG. 8 shows a longitudinal sectional view illustrating a state in which a release bush is pressed into the tube joint shown in FIG. 6, whereby the chuck that bites into the fluid tube is separated.

Finally, when the fluid tube 16 disengages from the tube joint 10, the flange section 68 of the release bush 36 is pressed toward the connecting section 15 (in the direction of arrow B), as shown in FIG. 8. Accordingly, the diametrally reduced section 66 of the release bush 36 presses the side surface of the curved section 88 of the chuck 72. The curved section 88 is displaced toward the packing 54 (in the direction of arrow B), under a pressing action effected by the diametrally reduced section 66. Therefore, the other end of the chuck 72 is forcibly displaced radially outwardly. Further, the fastening pawl 86, which bites into the outer circumferential surface of the fluid tube 16, separates from the outer circumferential surface of the fluid tube 16.

As a result, the fluid tube 16 is released from its fastened state, which was effected by the chuck 72, in the axial direction. Therefore, the fluid tube 16 can be disengaged from the tube joint 10 by pulling the fluid tube 16 in a direction to separate the fluid tube 16 from the body 12 (in the direction of arrow A).

Figure 10:
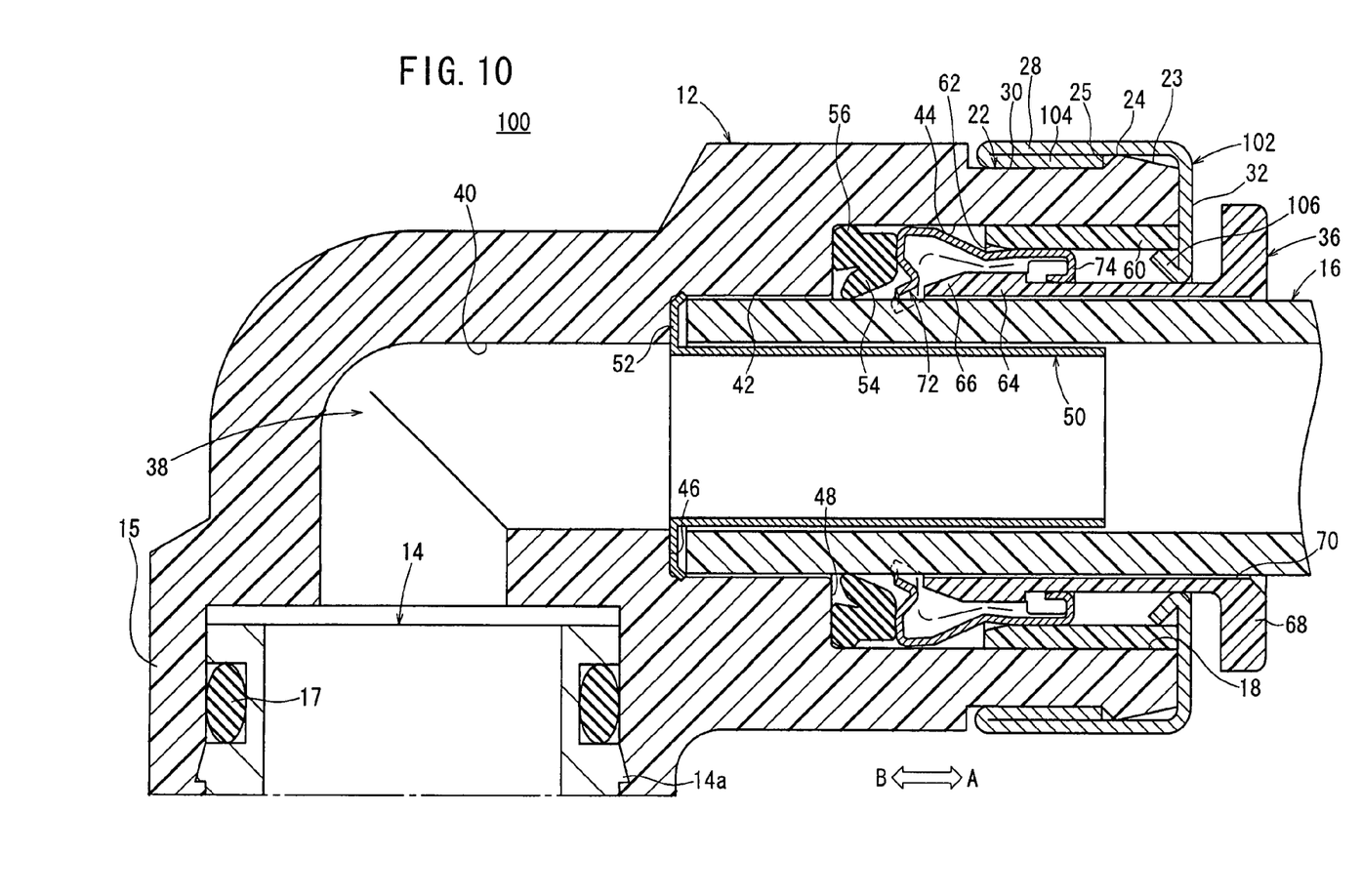
FIG. 10 shows a longitudinal sectional view illustrating a state in which a fluid tube is inserted into a tube joint according to a second embodiment of the present invention.

Next, a tube joint 100 according to a second embodiment is shown in FIG. 10. The same constitutive components as those of the tube joint 10 according to the first embodiment described above are designated by the same reference numerals, and detailed explanation thereof shall be omitted.

The tube joint 100 according to the second embodiment is different from the tube joint 10 according to the first embodiment in the following features. That is, a fixing ring 102 is provided, which is formed of a thin plate member having a substantially constant thickness. The thin plate member is folded back toward the orthogonal wall section 32 (in the direction of arrow A) so that an overlapped section 104, overlapping the circumferential wall section 28, is formed at the circumferential wall section 28 of the fixing ring 102. The overlapped section 104 engages with the apex section 24 of the installation groove 22, and thus the fixing ring 102 is integrally installed to the body 12.

A bent section 106, which is bent by a predetermined angle toward the guide member 60, is formed at the end of the orthogonal wall section 32 of the fixing ring 102 opposed to the outer circumferential surface of the release bush 36. The end of the bent section 106 abuts against the inner circumferential surface of the guide member 60.

That is, when the structure described above is adopted, the fixing ring 102 can be produced conveniently at low cost, for example, by press-working the thin plate member. When the overlapped section 104 of the fixing ring 102 engages with the apex section 24, the fixing ring 102 is prevented from disengagement from the body 12, and therefore the guide member 60 can be appropriately retained by the aid of the bent section 106.

Further, when the fixing ring 102 is formed from a thin plate member, it is possible to reduce its weight and thus produce a lightweight tube joint 100.

Figure 11:
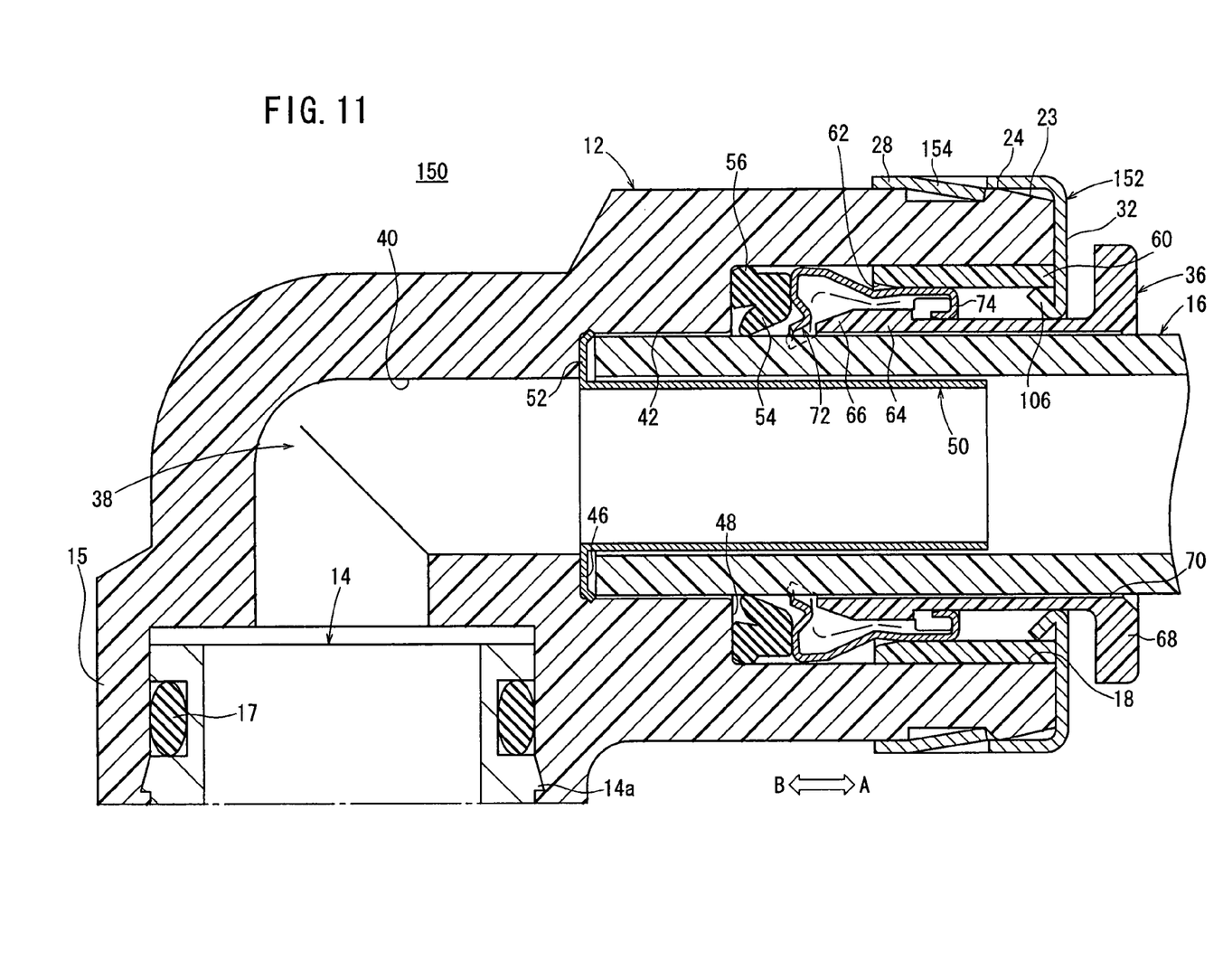
FIG. 11 shows a longitudinal sectional view illustrating a modified embodiment of the tube joint shown in FIG. 10.

Next, a modified embodiment of the tube joint 100, in accordance with the second embodiment, is shown in FIG. 11.

A tube joint 150 according to this modified embodiment is different from the tube joint 100 according to the second embodiment in the following features. That is, a plurality of engaging projections 154, which slightly protrude toward the installation groove 22, are formed on the circumferential wall section 28 of a fixing ring 152. The engaging projections 154 engage with the apex section 24, and thus the fixing ring 152 is integrally installed to the body 12.

The engaging projections 154 are formed so that they are separated from each other by predetermined spacing distances in the circumferential direction of the fixing ring 152. The outer circumferential surface of the circumferential wall section 28, on which the engaging projections 154 are formed, is recessed by a predetermined depth toward the inner circumferential side.

More specifically, when the structure described above is used, the fixing ring 152 can be produced conveniently at low cost, for example, by press-working a thin plate member. Further, the engaging projections 154 of the fixing ring 152 engage with the apex section 24, in order to avoid disengagement from the body 12. Simultaneously, the guide member 60 can be retained by the bent section 106, which is formed at the end of the orthogonal wall section 32.

Further, by forming the fixing ring 152 from a thin plate member, it is possible to reduce the weight of the tube joint 150.

Although certain preferred embodiments of the present invention have been shown and described in detail, it should be understood that various changes and modifications may be made therein without departing from the scope of the appended claims.

What is claimed is:

1. A tube joint comprising:
   a resin material body into which a fluid tube is inserted and which is formed to be cylindrical;
   a chuck which is provided in said body and which retains said fluid tube in said body through engagement with an outer circumferential surface of said fluid tube;
   a cylindrical guide member which is provided between said body and an outer circumferential surface of said chuck; and
   a non-threaded ring member which is composed of a metal material and which is provided radially outwardly with respect to said guide member with said body intervening therebetween,
   wherein said chuck is expanded in diameter and an inclined section of said chuck abuts against an inclined surface of said guide member to press said guide member radially outwardly when said fluid tube is pulled in a direction to make separation from said body, and said body, a portion of which is provided on the outer circumferential side of said guide member, is pressed radially outwardly by said guide member, whereby said body is retained by said ring member,
   wherein a projection, which protrudes radially outwardly, is formed on a non-threaded outer circumferential surface of said body, said ring member is engaged with said projection, and displacement of said ring member in an axial direction is regulated, and
   wherein said ring member has a first wall section which is fitted to said non-threaded outer circumferential surface of said body, and a second wall section which is disposed substantially perpendicular to said first wall section and which abuts against ends of said guide member and said body.

2. The tube joint according to claim 1, wherein a tapered surface, which is gradually reduced in diameter radially inwardly from said projection, is formed on said outer circumferential surface of said body.

3. The tube joint according to claim 1, wherein said guide member includes said inclined surface, which is opposed to said chuck.

4. The tube joint according to claim 1, wherein said ring member is fabricated from a bent metallic member, said ring member comprising an overlapped section formed by overlapping a portion of said first wall section on an inner circumferential side of said first wall section, wherein said overlapped section engages with said projection of said body.

5. The tube joint according to claim 4, wherein a bent section, which is bent toward said guide member, is formed at said second wall section of said ring member, and said bent section abuts against an inner circumferential surface of said guide member.

6. The tube joint according to claim 1, wherein said ring member is fabricated from a bent metallic member, and comprises an engaging projection, which protrudes toward said body, formed at said first wall section, and said engaging projection engages with said projection of said body.

7. The tube joint according to claim 6, wherein said engaging projection is gradually inclined radially inwardly from said first wall section toward said projection.

8. The tube joint according to claim 6, wherein a bent section, which is bent toward said guide member, is formed at said second wall section of said ring member, and said bent section abuts against an inner circumferential surface of said guide member.

9. A tube joint comprising:
a resin material body into which a fluid tube is inserted and which is formed to be cylindrical;
a chuck which is provided in said body and which retains said fluid tube in said body through engagement with an outer circumferential surface of said fluid tube;
a cylindrical guide member which is provided between said body and an outer circumferential surface of said chuck; and
a non-threaded ring member which is composed of a metal material and which is provided radially outwardly with respect to said guide member with said body intervening therebetween,
wherein said chuck is expanded in diameter and an inclined section of said chuck abuts against an inclined surface of said guide member to press said guide member radially outwardly when said fluid tube is pulled in a direction to make separation from said body, and said body, a portion of which is provided on the outer circumferential side of said guide member, is pressed radially outwardly by said guide member, whereby said body is retained by said ring member, and
wherein said ring member has a first wall section which is fitted to a non-threaded outer circumferential surface of said body, and a second wall section which is disposed substantially perpendicular to said first wall section and which abuts against ends of said guide member and said body.

10. The tube joint according to claim 9, wherein said guide member includes said inclined surface, which is opposed to said chuck.

11. The tube joint according to claim 9, wherein said ring member is fabricated from a bent metallic member, said ring member comprising an overlapped section formed by overlapping a portion of said first wall section on an inner circumferential side of said first wall section, wherein said overlapped section engages with e-a44a projection of said body.

12. The tube joint according to claim 11, wherein a bent section, which is bent toward said guide member, is formed at said second wall section of said ring member, and said bent section abuts against an inner circumferential surface of said guide member.

13. The tube joint according to claim 9, wherein said ring member is fabricated from a bent metallic member, and comprises an engaging projection, which protrudes toward said body, formed at said first wall section, and said engaging projection engages with said projection of said body.

14. The tube joint according to claim 13, wherein a tapered surface, which is gradually reduced in diameter radially inwardly from said projection, is formed on said outer circumferential surface of said body.

15. The tube joint according to claim 13, wherein said engaging projection is gradually inclined radially inwardly from said first wall section toward said projection.

16. The tube joint according to claim 13, wherein a bent section, which is bent toward said guide member, is formed at said second wall section of said ring member, and said bent section abuts against an inner circumferential surface of said guide member.

* * * * *